(12) United States Patent
Xu et al.

(10) Patent No.: US 11,307,348 B2
(45) Date of Patent: Apr. 19, 2022

(54) BACKLIGHT MODULE AND DISPLAY DEVICE

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Jian Xu, Beijing (CN); Jianbo Xian, Beijing (CN); Yong Qiao, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 356 days.

(21) Appl. No.: 16/605,407

(22) PCT Filed: Apr. 26, 2019

(86) PCT No.: PCT/CN2019/084620
§ 371 (c)(1),
(2) Date: Oct. 15, 2019

(87) PCT Pub. No.: WO2019/228113
PCT Pub. Date: Dec. 5, 2019

(65) Prior Publication Data
US 2021/0405282 A1    Dec. 30, 2021

(30) Foreign Application Priority Data

May 30, 2018 (CN) .......................... 201820829076.9

(51) Int. Cl.
*F21V 8/00* (2006.01)

(52) U.S. Cl.
CPC ........... *G02B 6/0088* (2013.01); *G02B 6/005* (2013.01)

(58) Field of Classification Search
CPC .............................. G02B 6/005; G02B 6/0088
See application file for complete search history.

(56) References Cited

U.S. PATENT DOCUMENTS 7,780,333 B2 *  8/2010  Hsu ................... G02F 1/133606
                                                    362/633
8,031,289 B2 * 10/2011  Naritomi ........... G02F 1/133608
                                                    349/58

(Continued)

FOREIGN PATENT DOCUMENTS

CN    202835065 U    3/2013
CN    103676275 A    3/2014

(Continued)

OTHER PUBLICATIONS

The Extended European Search Report dated Dec. 16, 2021; Appln. No. 19783193.6.

*Primary Examiner* — Leah Simone Macchiarolo

(57) ABSTRACT

A backlight module and a display device are provided. The backlight module includes a back plate, an optical film, a light guide plate, and a fixing component. The optical film is provided at a light exiting side of the light guide plate, the back plate includes a bottom plate and a side plate located at least one end of the bottom plate, and the light guide plate is provided between the optical film and the bottom plate. The fixing component includes a first fixing subcomponent provided on the side plate and a second fixing subcomponent provided on the optical film, the first fixing subcomponent being clamped with the second fixing subcomponent.

18 Claims, 6 Drawing Sheets

(56) References Cited

U.S. PATENT DOCUMENTS

| | | | |
|---|---|---|---|
| 9,310,549 B2 | 4/2016 | Zhou et al. | |
| 9,323,104 B2* | 4/2016 | Cho | G02F 1/133608 |
| 9,897,852 B2* | 2/2018 | Ma | G02F 1/133606 |
| 9,977,176 B2* | 5/2018 | Horiguchi | G02B 6/0088 |
| 11,085,593 B2* | 8/2021 | Sasaki | G02F 1/1335 |
| 2002/0080298 A1* | 6/2002 | Fukayama | G02F 1/133308 |
| | | | 349/58 |
| 2011/0255026 A1 | 10/2011 | Pan et al. | |
| 2012/0170250 A1* | 7/2012 | Huang | G02F 1/133608 |
| | | | 362/97.1 |
| 2014/0078441 A1 | 3/2014 | Wang et al. | |
| 2015/0009457 A1 | 1/2015 | Kubota | |
| 2019/0019445 A1 | 1/2019 | Xu et al. | |

FOREIGN PATENT DOCUMENTS

| | | |
|---|---|---|
| CN | 104006332 A | 8/2014 |
| CN | 204477831 U | 7/2015 |
| CN | 208314417 U | 1/2019 |
| WO | 2018/086356 A1 | 5/2018 |

\* cited by examiner

BACKLIGHT MODULE AND DISPLAY DEVICE

CROSS REFERENCE TO RELATED APPLICATIONS

This application claims priority to Chinese patent application No. 201820829076.9, filed on May 30, 2018, the entire disclosure of which is incorporated herein by reference.

TECHNICAL FIELD

Embodiments of the present disclosure relate to a backlight module and a display device.

BACKGROUND

A liquid crystal display (LCD) includes a liquid crystal display panel and a backlight module provided at a side of the liquid crystal display panel, and the backlight module is configured to provide a light source for the liquid crystal display panel.

SUMMARY

Embodiments of the present disclosure provide a backlight module and a display device.

At least one embodiment of the present disclosure provides a backlight module, comprising: a back plate, an optical film, a light guide plate and a fixing component. The optical film is provided at a light exiting side of the light guide plate. The back plate comprises a bottom plate and a side plate provided at at least one end of the bottom plate, the light guide plate is provided between the optical film and the bottom plate; and the fixing component comprises a first fixing subcomponent provided on the side plate and a second fixing subcomponent provided on the optical film, the first fixing subcomponent being clamped with the second fixing subcomponent.

For example, the side plate is provided with a first opening, the first fixing subcomponent comprises a fixing structure fixedly provided at the side plate through the first opening and a positioning structure connected with the fixing structure; and the second fixing subcomponent comprises a lug provided at least one end of the optical film, each lug being provided with at least one through hole, and the positioning structure passing through the through hole.

For example, the fixing structure comprises a first strip structure passing through the first opening, and a second strip structure and a third strip structure respectively located at two sides of the side plate, the second strip structure being connected with an end of the first strip structure away from the light guide plate, the second strip structure being attached to the side plate, the third strip structure being connected with another end of the first strip structure near the light guide plate, and the third strip structure being attached to the side plate.

For example, the fixing structure further comprises a fourth strip structure and a fifth strip structure connected with each other, the fourth strip structure being parallel to the light exiting surface of the light guide plate, and the fifth strip structure being parallel to the third strip structure; and the positioning structure is fixedly provided on the fifth strip structure along an extension direction of the fifth strip structure.

For example, the second strip structure has a length greater than that of the third strip structure.

For example, the first opening is a blind hole, the fixing structure comprises the first strip structure, and a part of the first strip structure is clamped in the first opening.

For example, an end of the first strip structure is provided with a buckle, the part of the first strip structure is clamped in the first opening by the buckle.

For example, the positioning structure is fixedly disposed at the fixing structure along a direction perpendicular to the light guide plate.

For example, the first opening has an aperture size in a first direction greater than a thickness of the first strip structure in the first direction, the first direction being perpendicular to the light exiting surface of the light guide plate.

For example, the second fixing subcomponent comprises lugs provided at opposite ends of the optical film, each of the lugs being provided with two through holes.

For example, the backlight module further comprises a sealant frame, the sealant frame comprising a strip frame and a strip extension structure inside the strip frame and extending inward, each lug is provided in a bent region surrounded by a side of the strip frame and a side of the strip extension structure, an end of the positioning structure being abutted with the strip extension structure.

For example, the sealant frame further comprises a first frame strip and a second frame strip provided at a side of the strip extension structure near the light guide plate, the first frame strip having an orthographic projection on the strip frame not overlapping with an orthographic projection of the second frame strip on the strip frame; the strip frame and the first frame strip being configured to clamp the side plate; and the strip frame and the second frame strip being configured to clamp the side plate and the fixing structure.

For example, a surface of the strip extension structure near the light guide plate is provided with a second opening, an end of the positioning structure being clamped in and connected with the second opening.

For example, the second opening is a through hole or a blind hole.

At least one embodiment of the present disclosure also provides a display device, comprising the backlight module.

For example, the backlight module comprises a sealant frame, the sealant frame being provided at a side surface of the optical film, the sealant frame comprising a strip frame and a strip extension structure located inside the strip frame and extending inward; the display device further comprises: a display panel provided in a bent area surrounded by a side of the strip extension structure away from the optical film and an inner side of the strip frame.

For example, the second strip structure has a thickness substantially equal to that of the third strip structure.

BRIEF DESCRIPTION OF THE DRAWINGS

Embodiments of the present disclosure will be described in more detail below in conjunction with the accompanying drawings to allow an ordinary skill in the art to more clearly understand embodiments of the present disclosure, in which.

DETAILED DESCRIPTION

Technical solutions of the embodiments will be described in a clearly and fully understandable way in connection with the drawings related to the embodiments of the disclosure. It is apparent that the described embodiments are just a part but not all of the embodiments of the disclosure. Based on the described embodiments herein, a person of ordinary skill in the art can obtain other embodiment(s), without any creative work, which shall be within the scope of the disclosure.

Unless otherwise defined, all the technical and scientific terms used herein have the same meanings as commonly understood by one of ordinary skill in the art to which the present disclosure belongs. The terms, such as 'first,' 'second,' or the like, which are used in the description and the claims of the present disclosure, are not intended to indicate any sequence, amount or importance, but for distinguishing various components. The terms, such as 'comprise/comprising,' 'include/including,' or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, 'on,' 'under,' 'left,' 'right,' or the like are only used to indicate relative position relationship, and when the absolute position of the object which is described is changed, the relative position relationship may be changed accordingly.

A backlight module includes a sealant frame, a light guide plate, and an optical film provided at a light exiting side of the light guide plate. The sealant frame includes a flat plate part provided at an edge position of the light exiting side of the light guide plate. A side of the flat plate part away from the light guide plate is configured to support a display panel: A side of the flat plate part near the light guide plate is attached to an edge of the optical film to fix the optical film.

Inventors have noticed that when a liquid crystal display is placed vertically or subjected to vibration, the optical film is prone to wrinkles; or, edge(s) of the optical film may be peel off between the flat plate part and the light guide plate. The positioning reliability of the optical film is poor, resulting in low stability of light output quality of the backlight module.

Figure 1:
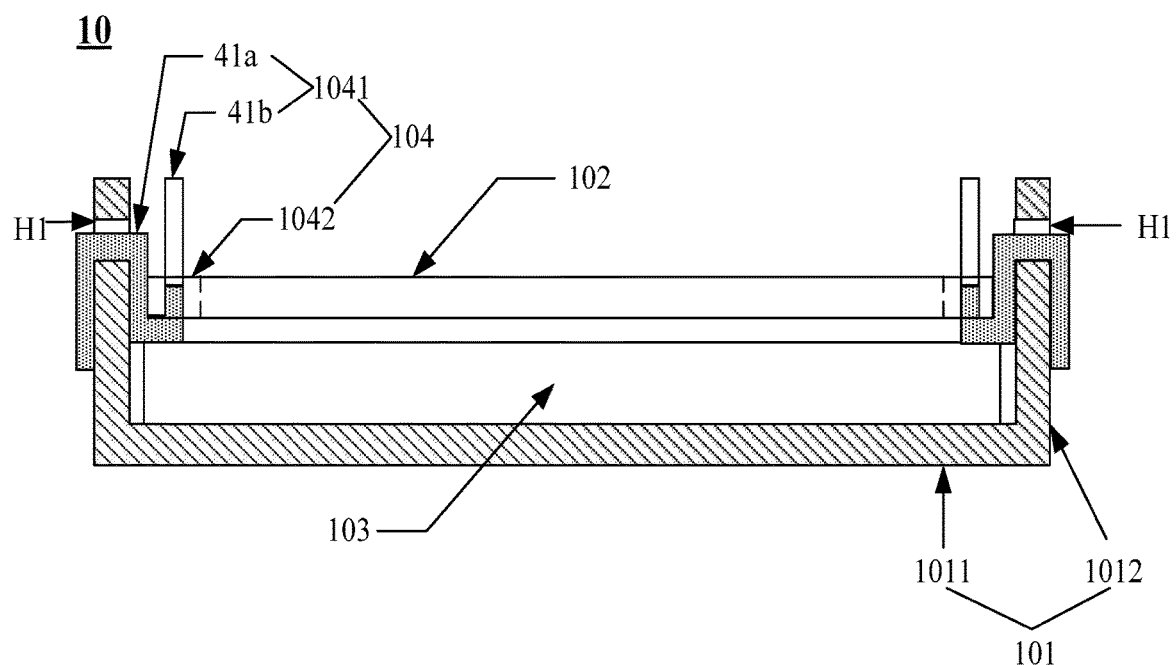
FIG. 1 is a schematically structural diagram of a backlight module provided by an embodiment of the present disclosure.

FIG. 1 is a schematically structural diagram of a backlight module provided by an embodiment of the present disclosure. As shown in FIG. 1, the backlight module 10 may include a back plate 101, an optical film 102, a light guide plate 103, and a fixing component 104.

The optical film 102 is provided at a light exiting side of the light guide plate 102. The back plate 101 includes a bottom plate 1011 and a side plate 1012 located at at least one end of the bottom plate 1011. The light guide plate 103 is provided between the optical film 102 and the bottom plate 1011. The fixing component 104 includes a first fixing subcomponent 1041 provided on the side plate 1012 and a second fixing subcomponent 1042 provided on the optical film 102, and the first fixing subcomponent(s) 1041 is/are clamped with the second fixing subcomponent 1042.

For example, in FIG. 1, two ends of the bottom plate 1011 are provided with side plates 1012.

For example, continuing to refer to FIG. 1, a side plate 1012 is provided with a first opening H1. The first fixing subcomponent 1041 includes a fixing structure 41a fixedly disposed at the side plate 1012 through the first opening H1 and a positioning structure 41b connected with the fixing structure 41a. The positioning structure 41b may be a strip structure. The positioning structure 41b is fixedly provided at the fixing structure 41a along a direction perpendicular to the light guide plate 103. For example, the fixing structure and the positioning structure may be an integral structure; or, the fixing structure and the positioning structure may be separate structures. The first fixing subcomponent is assembled by the fixing structure and the positioning structure, which is not limited thereto.

Figure 2:
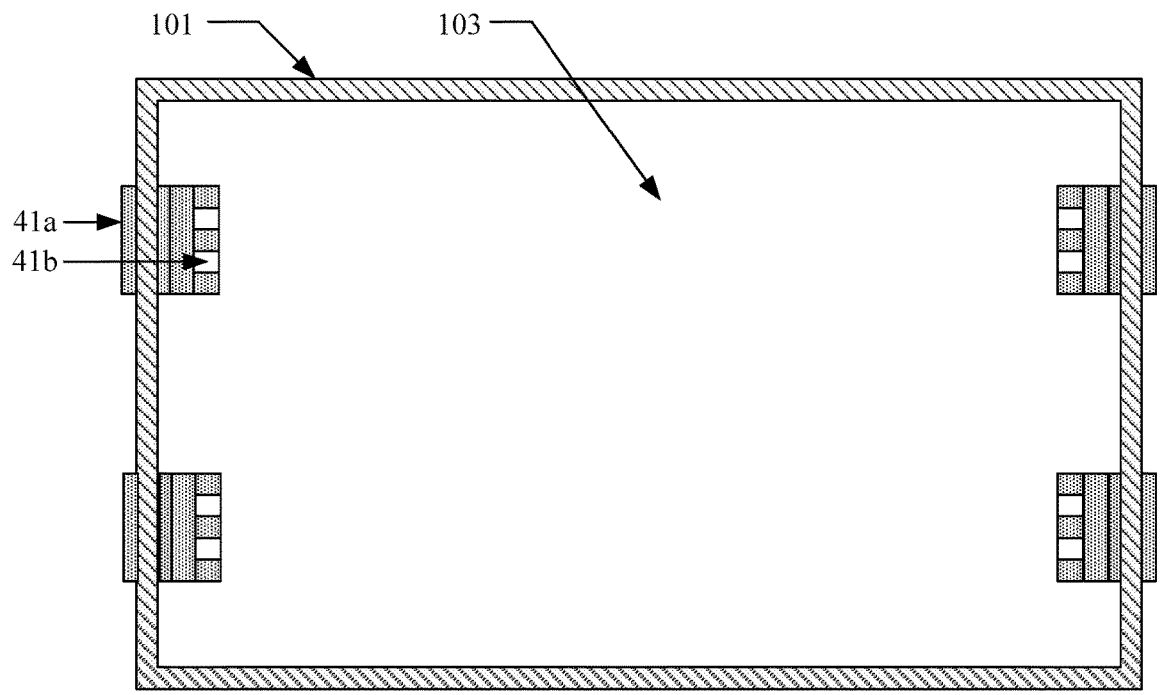
FIG. 2 is a top view of the backlight module shown in FIG. 1 without optical film.
Figure 3:
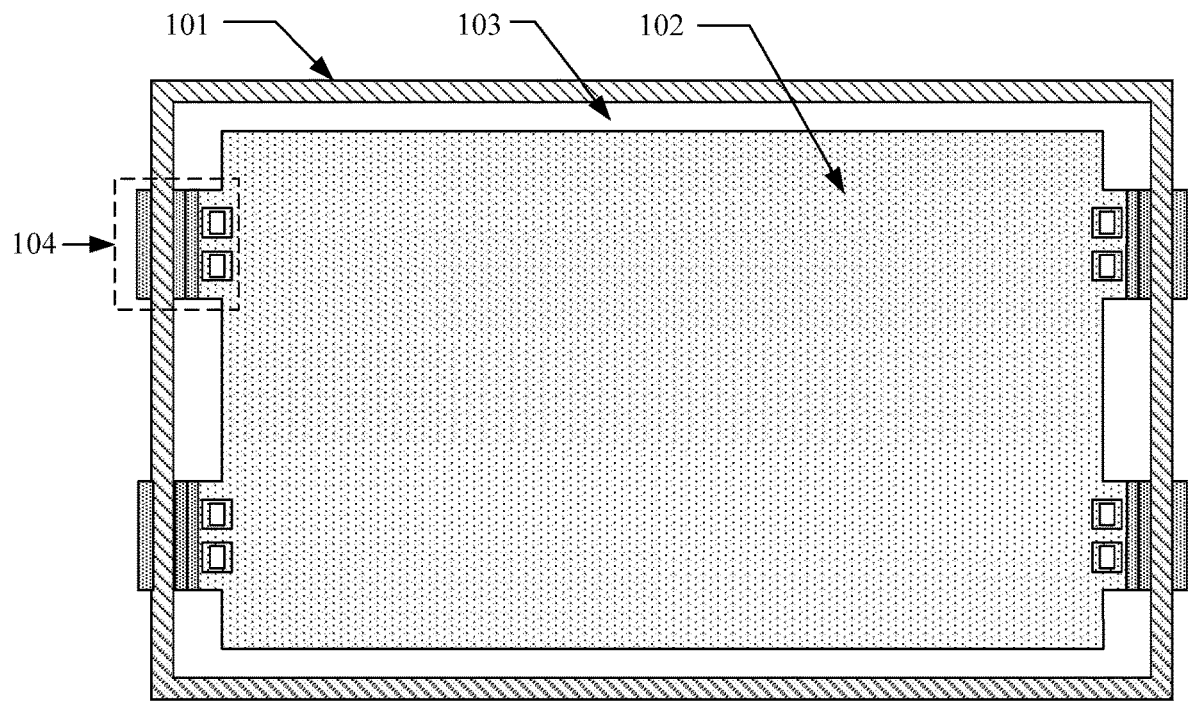
FIG. 3 is a top view of the backlight module shown in FIG. 1.

For example, FIG. 2 is a top view of the backlight module shown ill FIG. 1 without optical film. FIG. 3 is a top view of the backlight module shown in FIG. 1. Reference numerals in FIG. 2 and FIG. 3 refer to the reference numerals in FIG. 1, and are not described herein.

Figure 4:
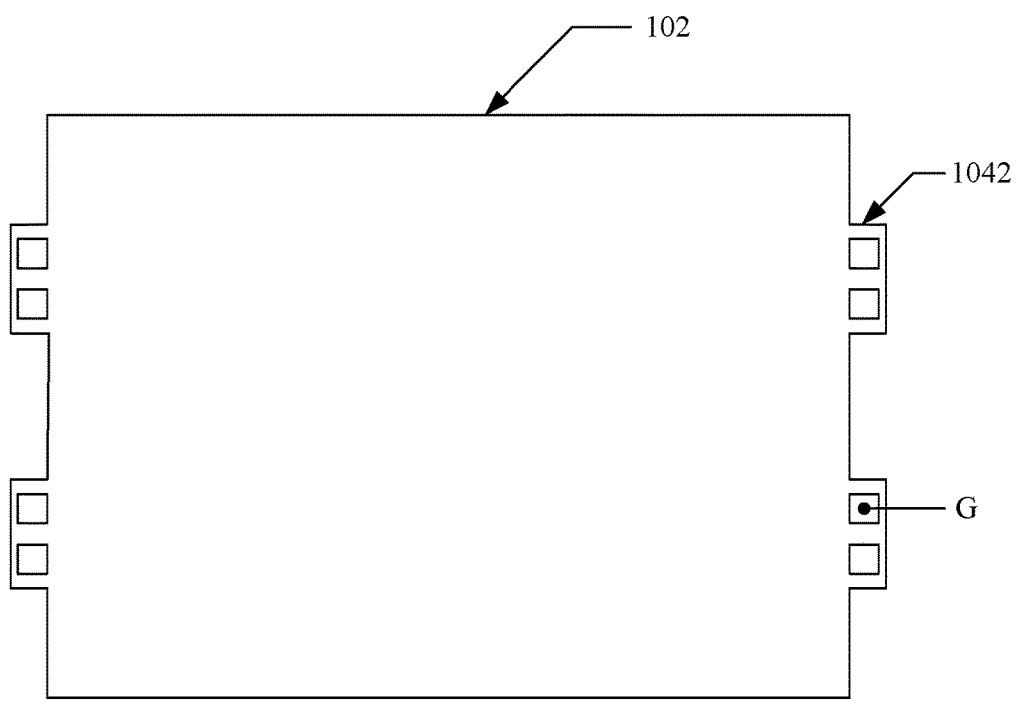
FIG. 4 is a schematically structural diagram of a backlight module provided by an embodiment of the present disclosure.

FIG. 4 is a schematically structural diagram of a backlight module provided by an embodiment of the present disclosure. As shown in FIG. 4, the second fixing subcomponent 1042 includes a lug provided at at least one end of the optical film. Each of lugs is provided with at least one through hole G. The positioning structure passes through the through hole G to fix the optical film.

For example, referring to FIG. 4, the second fixing subcomponent 1042 may include the lugs provided at opposite ends of the optical film 102, and each of the lugs is provided with two through holes G. However, embodiments of the present disclosure are not limited thereto. For example, when the size of the optical film is large, the lugs may be provided at each side of the optical film. In the embodiments of the present disclosure, positions at which the lugs are provided, a setting amount of the lugs and through holes provided in each of the lugs are not limited to above embodiments.

For example, the shape of the through hole in the lug is matched with the shape of the positioning structure. For example, a cross-section of the positioning structure is a circular, and the through hole in a lug may be designed as a circular through hole; or, the cross-section of the positioning structure is a rectangular, and the through hole in the lug may be designed as a rectangular through hole.

The backlight module provided by the embodiments of the present disclosure, by providing the first fixing subcomponent at the side plate of the back plate and providing the second fixing subcomponent at the optical film, the first fixing subcomponent being clamped with the second fixing subcomponent to allow the optical film to be fixedly disposed relative to the side plates. Due to a high stability of the back plate, when the backlight module is placed vertically or subjected to vibration, the optical film is less prone to be offset, so that the positioning reliability of the optical film is higher, and an optical quality of the backlight module is improved.

For example, the optical film may include a brightness enhancement sheet and a diffusion sheet. The first fixing subcomponent may be made of a metallic material or a polycarbonate material.

It is to be noted that the first opening may be a through hole or a blind hole. Based on different shapes of the first opening, the embodiments of the present disclosure provide different first fixing subcomponents, respectively.

Figure 5:
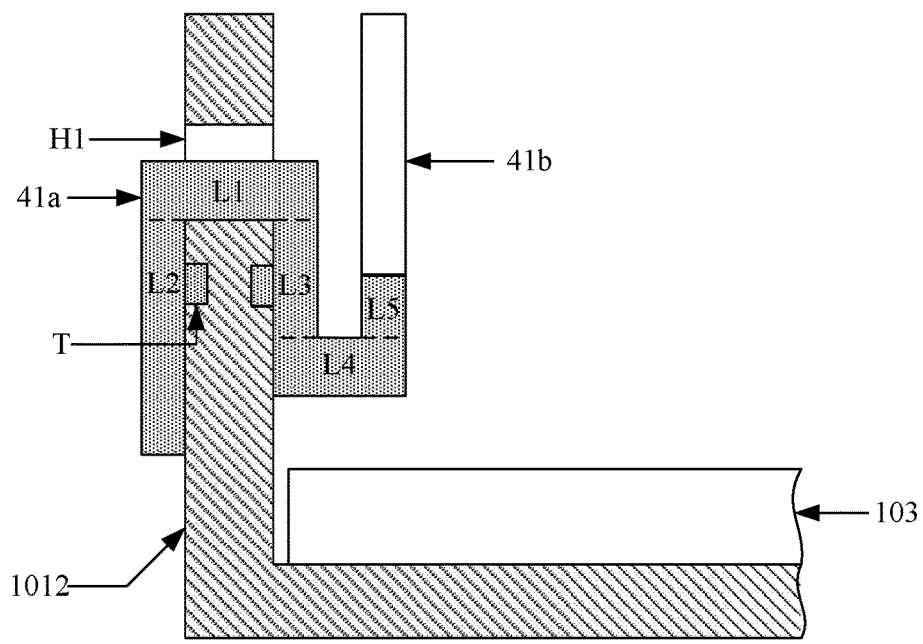
FIG. 5 is a schematically structural diagram of a first fixing subcomponent provided by an embodiment of the present disclosure.

When the first opening is a through hole, two kinds of first fixing subcomponents are provided, which include a first kind of the first fixing subcomponents, respectively. As shown in FIG. 5, a fixing structure 41a may include a first strip structure L1 that passes through the first opening H1 and a second strip structure L2 connected with an end of the first strip structure L1 away from the light guide plate 103. The second strip structure L2 is attached to the side plate 1012. For example, as shown in FIG. 5, the fixing structure 41a further includes a third strip structure L3, a fourth strip structure L4 and a fifth strip structure L5 which are connected. An end of the third strip structure L3 is connected with an end of the first strip structure L1 near the light guide plate 103, and the third strip structure L3 is attached to a surface of the side plate 1012. The fourth strip structure L4 is parallel to a light exiting face of the light guide plate 103. The fifth strip structure L5 is parallel to the third strip structure L3. The positioning structure 41b is fixedly provided on the fifth strip structure L5 along an extension direction of the fifth strip structure L5.

The fixing structure shown in FIG. 5 is similar to a double n-shaped structure, that is, similar to two connected n-shaped structures in parallel with opposite openings. The fixing structure 41a similar to a connected double n-shaped structure may be arranged at the side plate 1012 through the through hole in the side plate 1012. The positioning structure 41b is then disposed at the fixing structure 41a to form the first fixing subcomponent 1041. The structure of the first fixing subcomponent is simple and is easy to implement. For example, a length of the second strip structure L2 may be greater than a length of the third strip structure L3 to obtain the stability when the fixing structure is disposed at the side plate. A thickness of the second strip structure and a thickness of the third strip structure may be substantially equal to each other in design dimensions.

For example, in the fixing structure shown in FIG. 5, a surface of the second strip structure L2 attached to the side plate 1012 and/or a surface of the third strip structure L3 attached to the side plate 1012 may be provided with a convex structure T. The side plate 1012 is provided with openings at positions corresponding to the convex structures T. The convex structures T at a surface of the second strip structure L2 and/or a surface of the third strip structure L3 are disposed in the corresponding openings of the side plate, so that the stability of the fixing structure disposed at the side plate can be further improved.

For example, an aperture size of the first opening in a first direction is greater than a thickness of the first strip structure in the first direction, and the first direction is perpendicular to the light exiting surface of the light guide plate. The aperture size of the first opening is greater than the thickness of the first strip structure in the first direction, which facilitates the assembly of the fixing structure and the back plate. Additionally, the aperture size of the first opening in a second direction may be the same as a width of the first strip structure in the second direction. The second direction is a direction perpendicular to the paper plane of FIG. 5.

Figure 6:
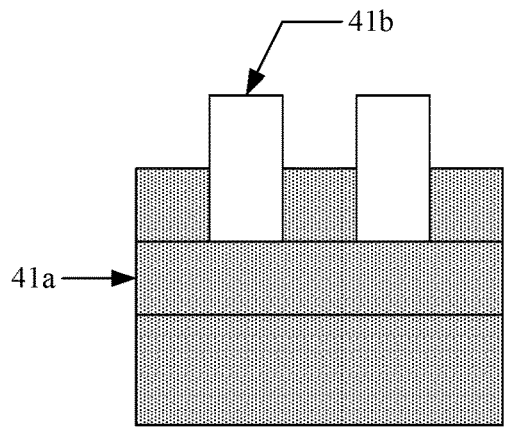
FIG. 6 is a front view of the first fixing subcomponent shown in FIG. 5.
Figure 7:
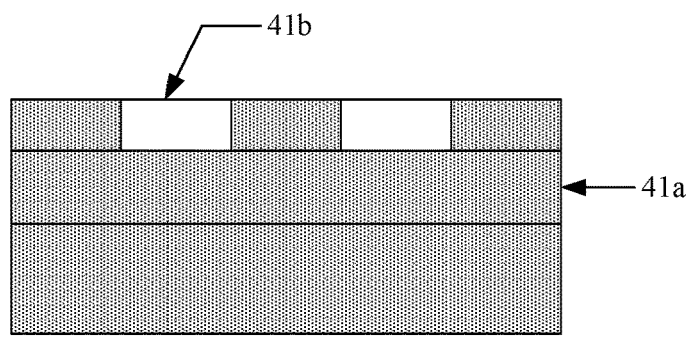
FIG. 7 is a top view of the first fixing subcomponent shown in FIG. 5.

For example, FIG. 6 is a front view of the first fixing subcomponent shown in FIG. 5. FIG. 7 is a top view of the first fixing subcomponent shown in FIG. 5. Reference numerals in FIG. 6 and FIG. 7 refer to the reference numerals in FIG. 5, and are not repeated herein.

Figure 8:
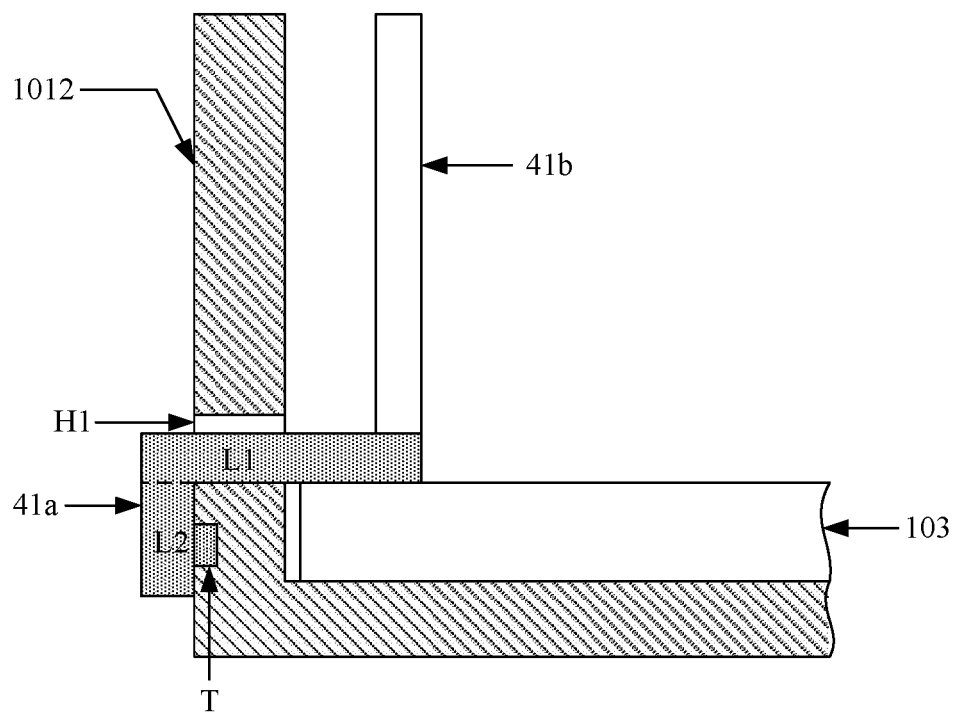
FIG. 8 is a schematically structural diagram of another first fixing subcomponent provided by an embodiment of the present disclosure.

As shown in FIG. 8, another fixing structure is provided. The fixing structure 41a may include a first strip structure L1 that passes through the first opening H1 and a second strip structure L2 connected with an end of the first strip structure L1 away from the light guide plate 103. The second strip structure L2 is attached to the side plate 1012. For example, as shown in FIG. 8, the fixing structure 41b may be fixedly disposed at the first fixing structure L1 along a direction perpendicular to an extension direction of the first strip structure L1.

For example, as shown in FIG. 8, the first strip structure L1 may be attached to the light exiting surface of the light guide plate 103. It is to be noted that the light guide plate can support the fixing structure to permit the structural stability of the first fixing subcomponent.

For example, in the fixing structure shown in FIG. 8, a surface of the second strip structure L2 that is attached to the side plate 1012 may be provided with a convex structure T. The side plate 1012 is provided with an opening at a position corresponding to the convex structure T. The convex structure T at the second strip structure L2 is disposed in the corresponding opening of the side plate, so that the stability of the fixing structure disposed at the side plate can be further improved.

Figure 9:
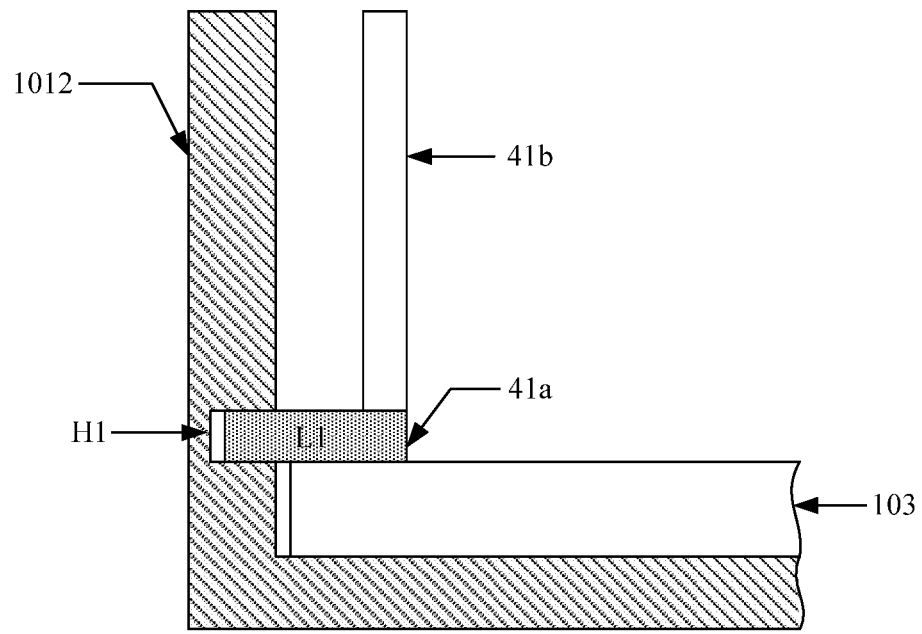
FIG. 9 is a schematically structural diagram of still another first fixing subcomponent provided by an embodiment of the present disclosure.

For example, when the first opening is a blind hole, a fixing structure is provided, which includes a third kind of fixing structures. As shown in FIG. 9, the fixing structure 41a includes a first strip structure L1. A part of the first strip structure L1 is clamped in the first opening H1.

For example, as shown in FIG. 9, the first strip structure L1 may be attached to the light exiting surface of the light guide plate 103. The fixing structure 41b is fixedly disposed at the first fixing structure L1 along the direction perpendicular to the extension direction of the first strip structure L1. The light guide plate call support the fixing structure to permit the structural stability of the first fixing subcomponent.

An end of the first strip structure can be provided with a buckle. A part of the first strip structure is clamped in the first opening through the buckle to allow the first strip structure to be fixedly connected with the side plate.

It is to be noted that the above three kinds of fixing structures are exemplary descriptions of the embodiments of the present disclosure, and the fixed structures may be other structures, which are not described herein.

Figure 10:
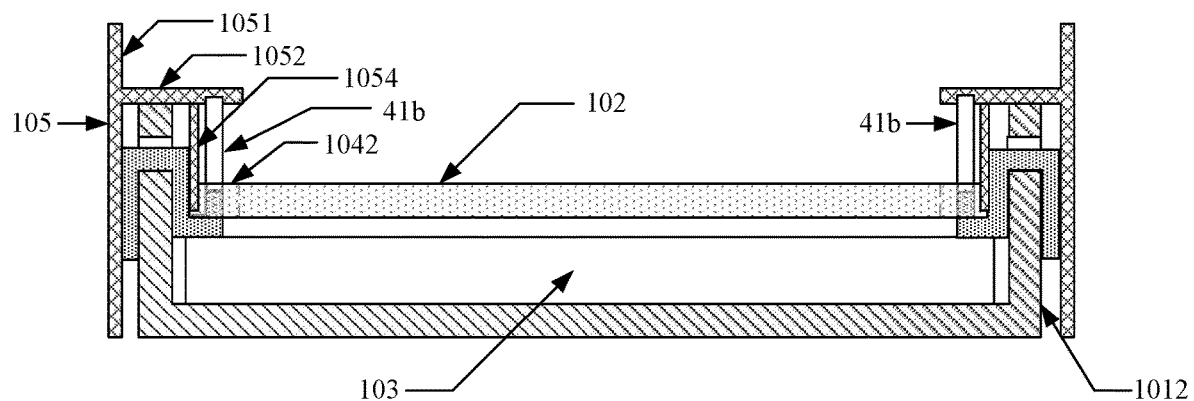
FIG. 10 is a schematically structural diagram of another backlight module provided by an embodiment of the present disclosure.

For example, as shown in FIG. 10, the backlight module 10 further includes a sealant frame 105. The sealant frame 105 includes a strip frame 1051 and a strip extension structure 1052 located at a side of the strip frame 1051. For example, a lug (the second fixing subcomponent 1042) is located in a bent region surrounded by a side of the strip frame 1051 and a side of the strip extension structure 1052, an end of the positioning structure 41b is abutted with the strip extension structure 1052.

Figure 11:
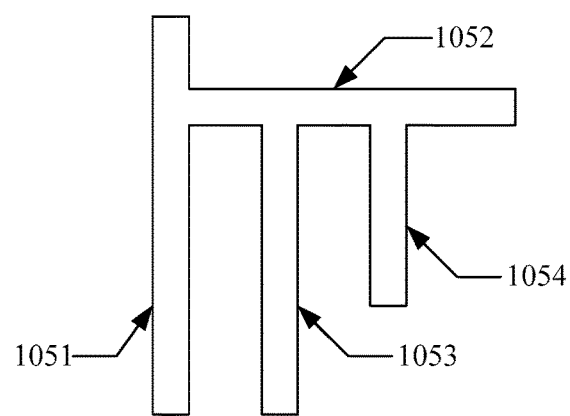
FIG. 11 is a side view of a sealant frame provided by an embodiment of the present disclosure.
Figure 12:
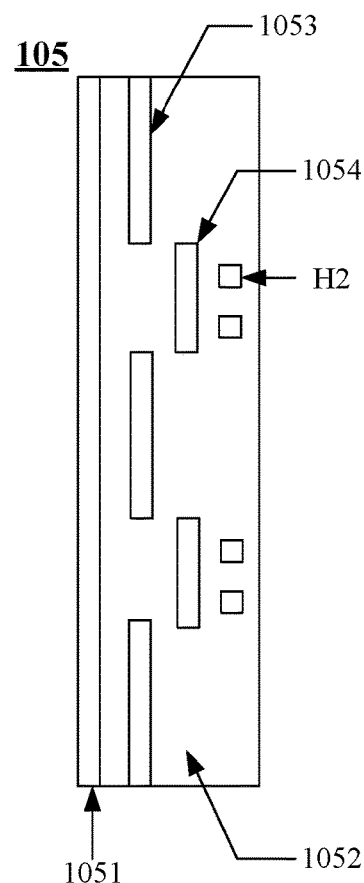
FIG. 12 is a bottom view of the sealant frame shown in FIG. 11.

FIG. 11 is a side view of a sealant frame provided by embodiments of the present disclosure. As shown in FIG. 11, the sealant frame 105 may include the strip frame 1051, the strip extension structure 1052, a first frame strip 1053 and a second frame strip 1054. FIG. 12 is a bottom view of the sealant frame shown in FIG. 11. As shown in FIG. 12, an orthographic projection of the first frame strip 1053 on the strip frame 1051 does not overlap with an orthographic projection of the second frame strip 1054 on the strip frame 1051.

For example, in conjunction with FIG. 10, the first frame strip (not shown in FIG. 10) and a second frame strip 1054 are disposed at a side of the strip extension structure 1052 near the light guide plate 103. The strip frame 1051 and the first frame strip are configured to clamp the side plate 1012. The strip frame 1051 and the second frame strip 1054 are configured to clamp the side plate 1012 and the fixing structure 41a.

It is to be noted that through clamping the side plate by the strip frame of the sealant frame and the first frame strip, and clamping the side plate and the fixing structure by the strip frame of the sealant frame and the second frame strip, the disposing stability of the fixing structure can be further improved and the positioning reliability of the optical film is improved.

For example, as shown in FIG. 12, a face of the strip extension structure 1052 near the light guide plate is provided with a second opening H2, and an end of the positioning structure may be clamped in and connected with the second opening H2. The end of the positioning structure is clamped in the second opening in the strip extension structure, which can prevent the positioning structure from moving to result in the slipping of the optical film, and the positioning reliability of the optical film is further improved. For example, the second opening may be a through hole or a blind hole.

The backlight module provided by the embodiments of the present disclosure, by providing the first fixing subcomponent at the side plate of the back plate and providing the second fixing subcomponent at the optical film, the first fixing subcomponent is clamped with the second fixing subcomponent to allow the optical film to be fixedly disposed relative to the side plate. Due to the high stability of the back plate, when the backlight module is placed vertically or subjected to vibration, the optical film is less prone to be offset, so that the positioning reliability of the optical film is higher, and the optical quality of the backlight module is improved.

Embodiments of the present disclosure also provide a display device. The display device includes the backlight module 10 shown in FIG. 1 or FIG. 10.

Figure 13:
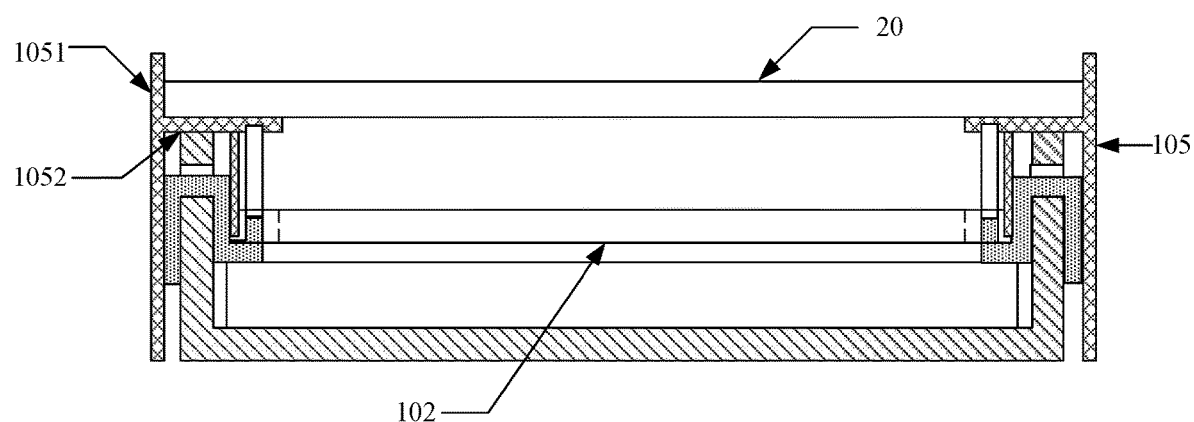
FIG. 13 is a schematically structural diagram of a display device provided by an embodiment of the present disclosure.

For example, FIG. 13 is a schematically structural diagram of a display device provided by embodiments of the present disclosure. The display device includes a backlight module. The backlight module may include a sealant frame 105. The sealant frame 105 is provided at a side of the optical film 102, and the sealant frame 105 includes a strip frame 1051 and a strip extension structure 1052 located at an inner side of the strip frame 1051 and extending inward. The display device further includes a display panel 20. The display panel 20 is provided in a bent area surrounded by a side of the strip extension structure 1052 away from the optical film 102 and the inner side of the strip frame 1051.

The display device provided by the embodiments of the present disclosure may be any product or component having a display function, such as a mobile phone, a tablet computer, a television, a display, a notebook computer, a digital photo frame, a navigator, etc.

The display device provided by the embodiments of the present disclosure, by providing the first fixing subcomponent at the side plate of the back plate in the backlight module and providing the second fixing subcomponent at the optical film, the first fixing subcomponent is clamped with the second fixing subcomponent to allow the optical film to be fixedly disposed relative to the side plate. Due to the high stability of the back plate, when the backlight module is placed vertically or subjected to vibration, the optical film is less prone to be offset, so that the positioning reliability of the optical film is higher, and the optical quality of the backlight module is improved. In this way, the display reliability of the display device is permitted.

The above description is only exemplary embodiments of the present disclosure and is not intended to limit the present disclosure. Any modifications, equivalent replacements, improvements, etc., made within the principle of the present disclosure shall be included in the scope of the present disclosure.

What is claimed is:

1. A backlight module, comprising:
   a back plate comprising a bottom plate and a side plate provided at at least one end of the bottom plate;
   a light guide plate provided on the bottom plate and comprising a light exiting surface;
   an optical film provided at the light exiting surface of the light guide plate;
   a fixing component comprising a first fixing subcomponent and a second fixing subcomponent;
   wherein the first fixing subcomponent is provided on the side plate, the second fixing subcomponent is provided on the optical film, the first fixing subcomponent and the second fixing subcomponent being cooperated to fix the optical film;
   the side plate is provided with a first opening, the first fixing subcomponent comprises a fixing structure fixedly provided at the side plate through the first opening and a positioning structure connected with the fixing structure;
   the second fixing subcomponent comprises a lug formed at at least one end of the optical film integrally, each lug being provided with at least one through hole, and the positioning structure passing through the through hole; and
   wherein the fixing structure comprises a first strip structure passing through the first opening, and a second strip structure and a third strip structure respectively located at two sides of the side plate, the second strip structure being connected with an end of the first strip structure away from the light guide plate, the second strip structure being attached to the side plate, the third strip structure being connected with another end of the first strip structure near the light guide plate, and the third strip structure being attached to the side plate.

2. The backlight module according to claim 1, wherein the fixing structure further comprises a fourth strip structure and a fifth strip structure connected with each other, the fourth strip structure being parallel to the light exiting surface of the light guide plate, and the fifth strip structure being parallel to the third strip structure; and the positioning structure is fixedly provided on the fifth strip structure along an extension direction of the fifth strip structure.

3. The backlight module according to claim 2, wherein the second strip structure has a length greater than that of the third strip structure.

4. The backlight module according to claim 3, wherein the first opening is a blind hole, the fixing structure comprises the first strip structure, and a part of the first strip structure is clamped in the first opening.

5. The backlight module according to claim 4, wherein the end of the first strip structure is provided with a buckle, the part of the first strip structure is clamped in the first opening by the buckle.

6. The backlight module according to claim 5, wherein the positioning structure is fixedly provided at the fixing structure along a direction perpendicular to the light guide plate.

7. The backlight module according to claim 6, wherein two side plates are provided at two ends of the bottom plate, respectively; two fixing components are correspondingly provided at the two side plates, respectively; and
each second fixing subcomponent comprises lugs provided at opposite ends of the optical film, each of the lugs being provided with two through holes.

8. The backlight module according to claim 7, further comprising a sealant frame, the sealant frame comprising:
a strip frame and a strip extension structure inside the strip frame and extending inward, each lug is provided in a bent region surrounded by a side of the strip frame and a side of the strip extension structure, an end of the positioning structure being abutted with the strip extension structure;
a first frame strip and a second frame strip provided at a side of the strip extension structure near the light guide plate, the first frame strip having an orthographic projection on the strip frame not overlapping with that of the second frame strip on the strip frame;
wherein the strip frame and the first frame strip are configured to clamp the side plate;
the strip frame and the second frame strip are configured to clamp the side plate and the fixing structure; and
a surface of the strip extension structure near the light guide plate is provided with a second opening, an end of the positioning structure is clamped in and connected with the second opening.

9. A display device, comprising,
the backlight module according to claim 8,
a display panel provided in a bent area surrounded by a side of the strip extension structure away from the optical film and an inner side of the strip frame.

10. The backlight module according to claim 1, wherein the first opening has an aperture size in a first direction greater than a thickness of the first strip structure in the first direction, the first direction being perpendicular to the light exiting surface of the light guide plate.

11. The backlight module according to claim 1, wherein the second fixing subcomponent comprises lugs provided at opposite ends of the optical film, each of the lugs being provided with two through holes.

12. The backlight module according to claim 1, further comprising a sealant frame,
the sealant frame comprising a strip frame and a strip extension structure inside the strip frame and extending inward, each lug is provided in a bent region surrounded by a side of the strip frame and a side of the strip extension structure, an end of the positioning structure being abutted with the strip extension structure.

13. The backlight module according to claim 12, wherein the sealant frame further comprises a first frame strip and a second frame strip provided at a side of the strip extension structure near the light guide plate, the first frame strip having an orthographic projection on the strip frame not overlapping with that of the second frame strip on the strip frame;
the strip frame and the first frame strip being configured to clamp the side plate; and
the strip frame and the second frame strip being configured to clamp the side plate and the fixing structure.

14. The backlight module according to claim 12, wherein a surface of the strip extension structure near the light guide plate is provided with a second opening, an end of the positioning structure being clamped in and connected with the second opening.

15. The backlight module according to claim 14, wherein the second opening is a through hole or a blind hole.

16. The backlight module according to claim 1, wherein the second strip structure has a thickness substantially equal to that of the third strip structure.

17. A display device, comprising a backlight module, wherein the backlight module comprises:
a back plate comprising a bottom plate and a side plate provided at at least one end of the bottom plate;
a light guide plate provided on the bottom plate and comprising a light exiting surface;
an optical film provided at the light exiting surface of the light guide plate;
a fixing component comprising a first fixing subcomponent and a second fixing subcomponent;
wherein the first fixing subcomponent is provided on the side plate, the second fixing subcomponent is provided on the optical film, the first fixing subcomponent and the second fixing subcomponent being cooperated to fix the optical film;
the side plate is provided with a first opening, the first fixing subcomponent comprises a fixing structure fixedly provided at the side plate through the first opening and a positioning structure connected with the fixing structure;
the second fixing subcomponent comprises a lug formed at at least one end of the optical film integrally, each lug being provided with at least one through hole, and the positioning structure passing through the through hole; and
wherein the fixing structure comprises a first strip structure passing through the first opening, and a second strip structure and a third strip structure respectively located at two sides of the side plate, the second strip structure being connected with an end of the first strip structure away from the light guide plate, the second strip structure being attached to the side plate, the third strip structure being connected with another end of the first strip structure near the light guide plate, and the third strip structure being attached to the side plate.

18. The display device according to claim 17, wherein the backlight module comprises a sealant frame, the sealant frame being provided at a side surface of the optical film, the sealant frame comprising a strip frame and a strip extension structure disposed inside the strip frame and extending inward;
the display device further comprises:

a display panel provided in a bent area surrounded by a side of the strip extension structure away from the optical film and an inner side of the strip frame.

* * * * *